Jan. 7, 1930. R. P. DICKERSON Re. 17,553

PAPER CUP

Original Filed Oct. 2, 1924

Inventor:
Rawson P. Dickerson
by
Ramsey Barton
Attorney.

Reissued Jan. 7, 1930 Re. 17,553

UNITED STATES PATENT OFFICE

RAWSON P. DICKERSON, OF EAST ORANGE, NEW JERSEY, ASSIGNOR, BY MESNE ASSIGNMENTS, TO UNITED STATES ENVELOPE COMPANY, OF WORCESTER, MASSACHUSETTS, A CORPORATION OF MAINE

PAPER CUP

Original No. 1,687,716, dated October 16, 1928, Serial No. 741,106, filed October 2, 1924. Application for reissue filed January 19, 1929. Serial No. 333,687.

The invention relates to a paper cup intended generally for individual use only and composed of a suitable grade of paper of the required stiffness and thickness to retain the contents the desired length of time. It has for its object an open-mouthed, self-extended cup of this character and composed of a single piece of the paper material, which cup shall have a smooth interior with the usual substantially circular mouth piece of the tumbler type of cup, but the sharp edge bottom of the closed mouth and flat envelope type, combining the advantages of both.

In carrying out the invention, there is produced from a single sector-like paper blank a naturally-distended cup without folds or creases in its side walls, but the bottom of this cup instead of tapering uniformly to a sharp point, or apex, like the unfolded self-extended conical paper cups heretofore produced takes the form of a straight line or edge of considerable length, the same being produced by folding up several thicknesses of material at the narrowed end of the rolled blank; in other words, the bottom of my improved cup is formed similarly to the bottoms in the flat folded sector-shaped cups which have been heretofore produced. In consequence of this construction, the cup produced by my invention is easily handled since it does not require distending, as do the flat cups, and it is easily held at the bottom between the fingers without exhibting any tendency to elevate itself when pressure is applied, as do the above described conical cups.

The invention has for a further object a cup which may be conveniently stacked, as by nesting a plurality of cups; and which shall be of such shape, moreover, that dispensing of individual cups may readily be effected as by a suitable cup dispensing machine, in manner well understood. A still furher object of the invention consists in the provision of a cup which will allow of forcing out of the contents, such as fruit ices, etc., thru squeezing the body of the cup, or by rolling up the same from the bottom, the remaining portion of the cup meanwhile retaining generally its form.

The nature of the invention, however, will best be understood when described in connection with the accompanying drawings, in which—

Figure 5:
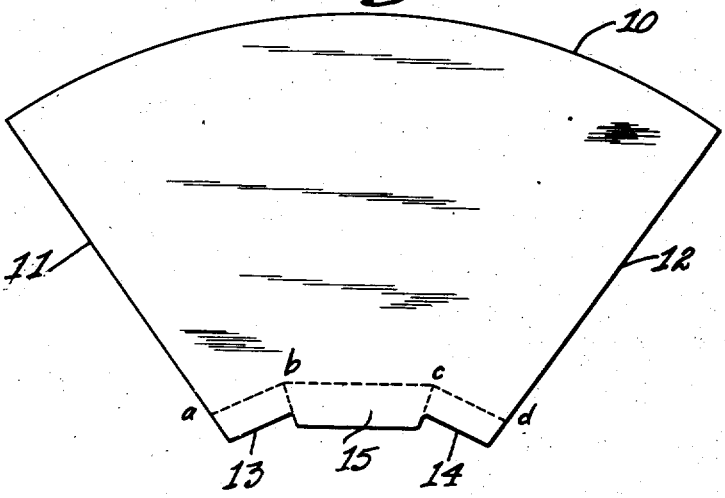
Fig. 5 is a plan of the blank from which the cup is formed up.

Referring to the drawings, Fig. 5 thereof illustrates the blank from which the cup is to be formed, and consists of a sector having the upper arc 10 and radial sides 11 and 12. The bottom of the sector is partly cut away; and the blank at the bottom is bounded by the edges 13 and 14, which may be arcs arranged substantially at right angles to the respective radial sides 11 and 12, and by an intermediate tab 15 extending outwardly from the bottom of the blank with its axis substantially coinciding with the medial radius of the sector.

Figure 1:
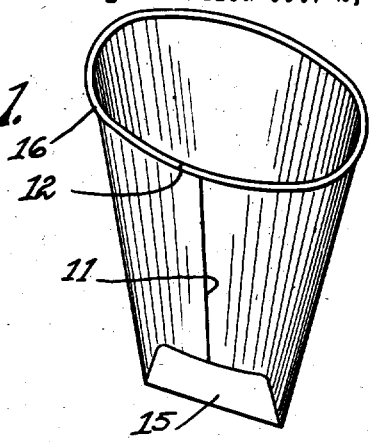
Fig. 1 is a perspective view of the novel cup.
Figure 2:
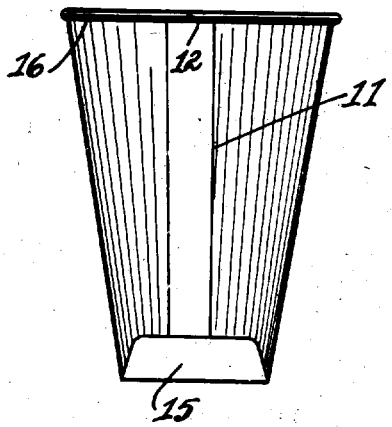
Fig. 2 is a front elevation.
Figure 4:
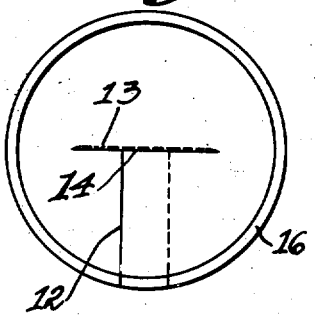
Fig. 4 is a plan view.
Figure 3:
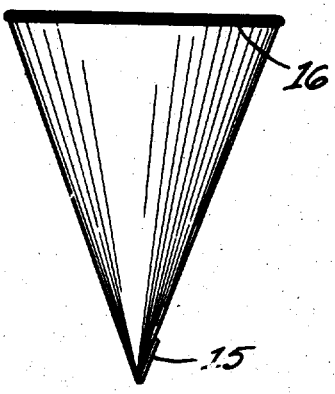
Fig. 3 is a side elevation thereof.

In forming the cup from this blank, the sides 11 and 12 are caused to overlap, as by rolling or curling the blank as indicated in Figs. 1 and 2, and to be secured to each other by a suitable adhesive in manner such that the union is substantially midway of the tab 15. The bottom edges 13 and 14 will thus be in juxtaposition and the seam therebetween is sealed by turning over slightly the said edges, as along the dotted lines *a*, *b*, *c*, *d*, to afford the usual "safety fold". In forming the fold along the lines *a*, *b*, *c*, *d*, sufficient pressure is applied to the overlapped sides 11 and 12 above the tab 15 to flatten the edges 13 and 14 and the tab 15 into a single common plane, without folding or creasing the sides of the funnel-like body above the flattened zone. After this, the flattened portion is folded over transversely along the lines *a*, *b*, *c*, *d* to bring the flattened tab 15 into engagement with the cup body to which it is secured by adhesive to complete the watertight closure of the cup bottom. Various forms of tabs may be employed, of course, and I do not wish to be restricted to the particular shape of tab shown; also, when not required, the "safety fold" may be omitted and merely the tab employed for the sealing.

The above described operation of flattening, folding up and adhesively securing the cup material, to provide a watertight bottom closure, completes for all practical purposes the cup of my invention; by said operation the cup is made to assume a wedge-like form, of gradually decreasing elliptical cross section toward its bottom, the ellipse sections becoming flatter and flatter as the bottom is approached. As a further refinement, the cup of my invention may be improved by spinning or rolling over its upper edge 10 to provide a bead 16 or rolled-over rim which not only insures against a sharp edge, when the cup is presented to the lips in use, but serves more especially to maintain the rounded naturally distended form of the cup body with the mouth piece substantially circular, as shown, the body being more or less conical in tapering both ways toward the flattened bottom. This cup, moreover, is of a shape best suited for convenient and natural holding by the hand while providing ample rigidity, and it does not have the tendency to slide out of one's hand as is the case with a purely conical cup. The cups of my invention are readily susceptible of being closely nested, one within the other, in stack form, for packing and for easy distribution from a cabinet or container; their removal, one by one, from the bottom of a stack, or from the top of an inverted stack, is a particularly convenient operation, due to the facility of seizure by the fingers which is afforded by the wedge-shaped lower portion of each cup. Furthermore, the beading 16 provides for a rim of sufficient rigidity to allow of assistance in the forcible introduction into the cup of materials such as ice cream, fruit ices and the like. The rim is also of sufficient rigidity to enable the cup to resist collapse under the weight of the contents and will maintain under all conditions likely to be met with the circular or elliptical shape of the mouth piece and the generally rounded form of the body, notwithstanding the sharp bottom termination of the base. The cup, also, is of considerable depth and for the amount of material employed in its construction is of relatively large capacity. The construction, moreover, obviates against any dropping out of the bottom as in the case of a two-piece cup and eliminates the fluting required in the construction of a one-prece tumbler type of cup.

I claim:

1. As a new article of manufacture, a paper drinking cup whose body presents a substantially rounded self-extended mouth, said body of naturally-distended open form being of decreasing elliptical cross-section toward its lower end and terminating in a watertight bottom closure made by a substantially straight line fold-up of the cup material secured to the body wall, the line of fold of said fold-up being substantially parallel to the major axes of said elliptical sections, and of sufficient length to afford a finger grip for the seizure of the cup by its bottom.

2. As a new article of manufacture, a paper drinking cup having its body portion terminating in a self-extended substantially rounded mouth, said body of naturally-distended open form tapering from its mouth in wedge-like form to a watertight bottom closure made by a straight edge transverse fold-up of the cup material secured to the body wall, the line of fold of said fold-up being of sufficient length to throw substantially the entire body portion into elliptical section.

3. As a new article of manufacture, a paper drinking cup having its body portion in self-extended substantially rounded form, said body from its open mouth tapering in wedge-like form to a watertight bottom closure made by a straight edge transverse fold-up of the cup material secured to the body wall, the line of fold of said fold-up being of sufficient length to provide a base for resting the cup against a finger of the user, when held in filling position in his hand.

4. As a new article of manufacture, a paper drinking cup having a naturally-open self-extended body, said body from the open mouth thereof being of decreasing elliptical cross section toward its lower end and terminating in a watertight bottom closure made by a substantially straight line fold-up of the cup material secured to the body wall, the line of fold of said fold-up being of sufficient length to afford a finger grip for the seizure of the cup by its lower end, and the minor axes of said elliptical sections decreasing at a faster rate than the major axes thereof, whereby the section of the cup body, at the lower end thereof, is substantially flat, for facility in grasping said lower end between the fingers.

5. As a new article of manufacture, a one-piece paper drinking cup having an open self-extended mouth and a downwardly-tapered rounded body terminating in a wedge-shaped bottom closed by a tab integral with the body material, said mouth having a beaded rim to maintain the shape of said body.

RAWSON P. DICKERSON.